July 19, 1949.  F. H. NICOLL  2,476,619
CASCADE PHOSPHOR SCREEN
Filed Aug. 23, 1946
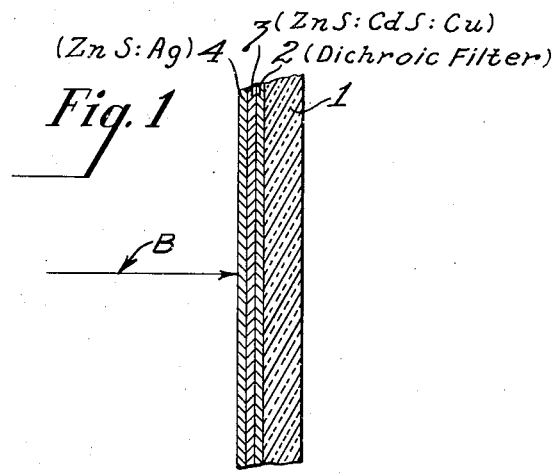
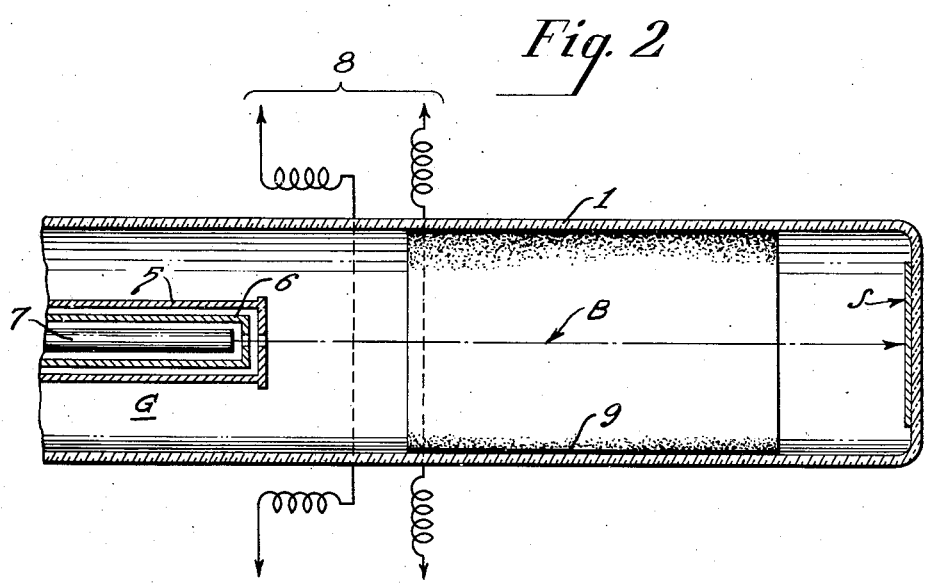
INVENTOR.
Frederick H. Nicoll
BY
William A. Zalesak
ATTORNEY.

Patented July 19, 1949

2,476,619

UNITED STATES PATENT OFFICE 2,476,619

CASCADE PHOSPHOR SCREEN

Frederick H. Nicoll, Princeton, N. J., assignor to Radio Corporation of America, a corporation of Delaware Application August 23, 1946, Serial No. 692,457

7 Claims. (Cl. 250—164)

1

This invention relates to phosphor screens in cathode ray tubes and is particularly useful in radar tubes though not limited thereto.

In certain types of cathode ray tubes the phosphor screen is cascade excited. In such tubes the screen consists of, say, two layers, one adapted to emit light under bombardment by the beam, and another adapted to emit light under excitation by the light emitted by the first layer. In certain uses the light emitted by the layer under beam bombardment is desirable only for excitation of the second layer and its transmission through the second layer to the observer along with the light emitted by the second layer is detrimental. One example of this is in radar tubes.

There are certain phosphors that have much longer persistence when excited by light of a particular wavelength, for example blue light, than when excited by bombardment of electrons. In radar tubes a phosphor of relatively long persistence is desirable and therefore phosphor screens for such tubes have been made of two layers, one to be excited by the cathode ray beam of the tube for production of blue light, for example of relatively short persistence and the other for excitation by the emitted blue light to produce, say, yellow light.

In cascade screens for radar tubes as referred to the blue light produced by the one phosphor is not all absorbed by the other phosphor and this produces an undesired blue flash in the trace. This flash obscures the yellow afterflow and in addition spoils the dark adaptation of the eye. To eliminate this blue flash, filters have been placed in front of both screens that will pass the yellow light and absorb the blue light but this is inefficient.

It is an object of this invention to provide a cascade phosphor screen in which that portion of the exciting light emitted by one layer, and passed through the layer excited thereby, is reflected by a selective reflector back thereinto, while the light emitted by the latter layer is not reflected but is transmitted.

Another object of the invention is to provide a two layer cascade phosphor screen with a selective reflector to reflect the light emitted by one phosphor layer and to transmit the light emitted by the other phosphor layer.

Still another object of this invention is to provide means for reflecting the blue light flash of cascade screens back into the phosphor to produce additional excitation thereof.

Another object of the invention is to provide

2 a cascade screen with a reflector for blue light that will efficiently transmit yellow light.

Other objects of the invention will appear in the following description, reference being had to the drawing, in which:

Fig. 1 illustrates a phosphor screen embodying the invention;

Fig. 2 is a section of a cathode ray tube embodying the screen and reflector.

Referring to Fig. 1 of the drawing, on the inner side of the end of the evacuated glass envelope 1 of the tube is deposited a selective reflector 2 that passes yellow light and reflects blue light, for example. There are various ways of making such a reflector but a suitable one can be made of a plurality of very thin successive layers of materials of different indexes of refraction as disclosed in the article by G. L. Dimmick in the Journal of the Society of Motion Picture Engineers, vol. XXXVIII, pages 36 to 44, January, 1942.

For example a six layer film having alternate layers of zinc sulfide and thorium oxi-fluoride may be used. Such a film reflects blue and transmits yellow light if each layer is one-fourth of the wavelength of blue light and the first layer on the glass is thorium oxi-fluoride and the last is zinc sulfide. Thorium oxi-fluoride has a refractive index of about 1.48 while zinc sulfide has an index of about 2.3. This reflector can be made to transmit about 90% of the yellow light and reflect 85% of the blue light.

The phosphor 3 is placed next to reflector 2 by any known method. It may consist essentially of zinc and cadmium sulfides, in about the ratio of 6 to 1, respectively, with copper activator. Onto layer 3 is laid down, by any method, the phosphor layer 4, emitting blue light under excitation by the beam B. This may consist of zinc sulfide with silver activator. Other phosphors may be used to produce light of the desired colors.

In operation, the cathode ray beam scans the cascade screen in known ways and produces blue light by impact of the beam electrons on the second layer 4. This blue light passes into the first layer 3 and causes it to emit yellow light. In present types of radar tubes that I have tested, about 30% of the blue light passes through the layer 3 and is entirely wasted and in addition reduces the visual effect of the yellow light. In my improvement, this unused blue light is reflected by selective reflector layer 2 back into the layer 3 and causes it to emit more yellow light, thus, in effect, producing a regenerating action in addition to eliminating the undesirable blue flash.

While the reflector slightly cuts down the desired yellow light, it more than compensates for this by the increased yellow light produced by the reflected blue light. The small amount of blue light passing the reflector is not objectionable.

Various means may be provided for utilizing the invention, but I have shown by way of example in Fig. 2 a cathode ray tube of common form having a screen embodying the invention. In this figure the gun G producing the beam B may have the usual first anode 5, grid 6 and cathode 7, the heater not being shown. The beam B projected through the apertures in the grid and first anode is scanned over the target by the deflecting coil unit 8, though electrostatic deflection may be used if desired. Either magnetic or electrostatic focusing means may be used but for simplification the focusing means is not illustrated, being well known in the art. A wall coating or equivalent anode 9 may be used.

Reference is made to my copending application, now U. S. Patent 2,439,181, April 16, 1948, which discloses an improvement of this invention.

While certain specific embodiments have been illustrated and described, it will be understood that various changes and modifications may be made therein without departing from the spirit and scope of the invention.

I claim:

1. In luminescing screens, a phosphor adapted to emit light of one color, means for projecting onto one side of said phosphor light of another color adapted to excite the phosphor to fluorescence, and a selective reflector on the other side of the phosphor adapted to transmit the major part of the first mentioned light and to reflect the major part of the second mentioned light passing therethrough.

2. A composite fluorescent screen comprising a layer of phosphor material adapted to emit visible light when excited by shorter wavelength radiation, and a selective reflector adjoining said layer and adapted to reflect said shorter wave radiation and to transmit the visible light emitted by said layer.

3. A light transparent foundation, a thin selective reflector layer on said foundation adapted to reflect light predominantly of a wavelength less than 4000 Å. and to transmit light predominantly of longer wavelength, and a phosphor layer on said reflector adapted to emit said longer wavelength light upon excitation by said shorter wavelength light.

4. A three layer screen comprising a first layer of a phosphor which upon excitation emits light predominantly of one color, an intermediate layer of a phosphor which upon excitation by light from the said first layer emits light predominantly of a different color, and a second layer which reflects the light from the first layer and transmits the light from the intermediate layer.

5. A composite phosphor screen comprising a first phosphor layer which generates short wavelength light upon excitation, a second phosphor layer exposed to and excited by the light from said first layer to generate light of longer wavelength, and a third layer underlying said second layer and adapted to reflect the short wave light generated by said first layer and to transmit the longer wavelength generated by said second layer.

6. In tubes having cascade screens, a phosphor layer adapted to produce blue light under impact of the beam electrons, another layer adjacent the first adapted to produce yellow light under excitation of said blue light and a reflector lying against the last mentioned phosphor layer adapted to transmit yellow light and reflect blue light.

7. In tubes having cascade screens, a phosphor layer adapted to produce light of one color of relatively short persistence under electron excitation, a second phosphor layer adjacent the first phosphor layer adapted to produce light of another color of long persistence upon excitation by the first mentioned light and a reflector adjacent the last mentioned layer to transmit the light emitted by the second mentioned layer and reflect the light emitted by the first mentioned layer.

FREDERICK H. NICOLL.

REFERENCES CITED

The following references are of record in the file of this patent:

UNITED STATES PATENTS

| Number | Name | Date |
| --- | --- | --- |
| 2,124,225 | Batchelor | July 19, 1938 |
| 2,171,970 | Brett | Sept. 5, 1939 |
| 2,243,097 | Henderson | May 27, 1941 |

FOREIGN PATENTS

| Number | Country | Date |
| --- | --- | --- |
| 474,907 | Great Britain | May 9, 1937 |